United States Patent [19]
Yoshihisa

[11] 4,447,901
[45] May 8, 1984

[54] MODE DISCRIMINATION CIRCUIT
[75] Inventor: Kozo Yoshihisa, Fukaya, Japan
[73] Assignee: Tokyo Shibaura Denki Kabushiki Kaisha, Kawasaki, Japan
[21] Appl. No.: 362,519
[22] Filed: Mar. 26, 1982
[30] Foreign Application Priority Data
  Mar. 31, 1981 [JP] Japan ................... 56-48070
[51] Int. Cl.³ ................ H04J 1/06; H04H 5/00; H04M 1/32
[52] U.S. Cl. ........................ 370/74; 370/76; 307/511
[58] Field of Search ............... 307/510, 511; 381/11, 381/12; 455/263, 265, 337; 375/120; 358/143; 370/74, 76

[56] References Cited
U.S. PATENT DOCUMENTS

| 3,956,710 | 5/1976 | Seitz et al. | 307/511 |
| 4,000,476 | 12/1976 | Walker et al. | 455/265 |
| 4,016,366 | 4/1977 | Kurata | 381/5 |
| 4,085,288 | 4/1978 | Viswanthan | 455/337 |

FOREIGN PATENT DOCUMENTS
2360499 6/1975 Fed. Rep. of Germany.

Primary Examiner—Douglas W. Olms
Assistant Examiner—Frank M. Scutch, III
Attorney, Agent, or Firm—Cushman, Darby & Cushman

[57] ABSTRACT

Dc voltages (E) of different levels are obtained at the output terminal of a phase comparator according to the broadcasting mode. A voltage comparator discriminates the broadcasting mode according to the level of the dc voltage. The voltage comparing circuit has two threshold voltages (EL), (EH) of different levels. The broadcasting mode is discriminated by detecting within which one of the three voltage ranges defined by the threshold voltages (EL), (EH) the dc voltage (E) falls. If E<EL, the dual-sound broadcasting mode is discriminated. If E<EH, the stereophonic mode is discriminated. If EL<E<EH, the monaural broadcasting mode is discriminated.

A subcarrier detector discriminates if the broadcasting mode is the monaural broadcasting mode or the multiplex broadcasting mode through detection of the subcarrier.

If a discrimination result indicating the monaural broadcasting mode is available from the subcarrier detector, a priority circuit outputs a discrimination signal representing the monaural broadcasting mode irrespective of the discrimination result from the voltage comparator.

9 Claims, 9 Drawing Figures

MODE DISCRIMINATION CIRCUIT

BACKGROUND OF THE INVENTION

The present invention relates to a mode discrimination circuit for discriminating the broadcasting mode of, for example, TV sound multiplex broadcasting.

In recent TV broadcasting, developments in the TV multiplex broadcasting system are enthusiastically made, which superposes other signals such as data signals on original TV broadcasting signals.

A TV sound multiplex broadcasting system is an example of such TV multiplex broadcasting systems. This TV sound multiplex broadcasting system simultaneously broadcasts the original sound signals with the other sound signals. Thus, this system broadcasts two different types of sound signals, and the sound channels are divided into a main channel and a subchannel for this purpose. The broadcasting mode is differentiated according to the contents of the sound signals to be inserted into the respective channels. There are two broadcasting modes: the dual-sound broadcasting mode and the stereophonic broadcasting mode. In the dual-sound broadcasting mode, sound signals of different contents are supplied to the respective channels. The bilingual broadcasting mode is an example of the dual-sound broadcasting mode. The bilingual broadcasting mode is adopted, for example, for a movie program in a foreign language. In this case, the sound signals of the Japanese language are supplied to the main channel, and the sound signals of the foreign language are supplied to the subchannel. In the stereophonic broadcasting mode, sum signals (L+R) of left signals (L) and right signals (R) are supplied to the main channel. On the other hand, difference signals (L−R) between the two signals are supplied to the subchannel.

Transmission and processing of the signals in a TV sound multiplex broadcasting system will briefly be described first. TV sound multiplex signals include pilot signals as reference for discrimination of the broadcasting modes at the receiver side in addition to the sound signals of the main channel (to be referred to as main channel signals hereinafter) and the sound signals of the subchannel (to be referred to as subchannel signals hereinafter) as has been described above. Carriers of the main channel signals are the same as those for the original sound signals. These carriers will be referred to as main carriers hereinafter. The main carrier frequency is higher than the frequency of the video signal carriers by 4.5 MHz. Carriers of the subchannel signals are those having a frequency higher than the main carrier frequency by about 31.5 MHz. These carriers will be referred to as the subcarriers. As the pilot signals, sine waves having a frequency of, for example, 922.5 Hz are used in the dual-sound broadcasting mode, and sine waves having a frequency of, for example, 982.5 Hz in the stereophonic broadcasting mode. As carriers for these pilot signals are used signals having a frequency higher than the main carrier frequency by about 55.1 kHz. These carriers will be referred to as pilot carriers.

The subcarriers are frequency-modulated by the subchannel signals. The pilot carriers are amplitudemodulated by the pilot signals. The frequency-modulated subchannel signals (to be referred to as modulated subchannel signals hereinafter) and the amplitudemodulated pilot signals (to be referred to as modulated pilot signals) are mixed with the main channel signals to provide composite signals. The main carriers are frequency-modulated by the composite signals, and the frequency-modulated main carriers are transmitted as the TV sound multiplex signals.

At the reception side, demodulation of the received TV sound multiplex signals is performed to provide the composite signals described above. These composite signals are directly used as the main channel signals and are also supplied to a band-pass filter for separating the modulated subchannel signals and a band-pass filter for separating the modulated pilot signals. The signals separated by the respective band-pass filters are subjected to predetermined demodulation and are obtained as the subchannel signals and the pilot signals. The demodulated pilot signals are supplied to a mode discrimination circuit which discriminates the broadcasting mode. If the frequency of the pilot signals is 922.5 kHz, the mode discrimination circuit discriminates the broadcasting mode to be the dual-sound broadcasting mode. On the other hand, if the frequency of the pilot signals is 982.5 Hz, the mode discrimination circuit discriminates the broadcasting mode to be the stereophonic broadcasting mode. If the discrimination result of the mode discrimination circuit is the dual-sound broadcasting mode, the demodulated main and subchannel signals are supplied to the corresponding speakers for reproduction. If the discrimination result of the mode discrimination circuit is the stereophonic mode, the main and subchannel signals are matricized, are separated into left signals (L) and right signals (R), and are supplied to the corresponding speakers.

Current TV broadcasting includes both TV sound multiplex broadcasting and the conventional monaural broadcasting. In the description to follow, the term TV sound multiplex broadcasting will be used in a broad sense to include monaural broadcasting as well. Dual-sound broadcasting and stereophonic broadcasting will be termed multiplex broadcasting as opposed to monaural broadcasting.

In monaural broadcasting, only the main channel signals of multiplex broadcasting are transmitted, and the subchannel signals and the pilot signals are not transmitted. Therefore, the discrimination of monaural broadcasting can be performed through the detection of the presence or absence of the pilot signals. Considering the points described above, the mode in which no pilot signals are transmitted may be considered as a mode in which a special type of pilot signal which has zero frequency is present.

The configuration of a conventional mode discrimination circuit for discrimination of the broadcasting mode through detection of the pilot signals will now be described. The conventional mode discrimination circuit typically has a first discriminating means for discriminating whether the broadcasting mode is the multiplex broadcasting mode or the monaural broadcasting mode, and a second discriminating means for discriminating, if the broadcasting mode is the multiplex broadcasting mode, whether the multiplex broadcasting mode is the dual-sound broadcasting mode or the stereophonic broadcasting mode. These two discriminating means basically are constituted by using phase locked loops (to be referred to as PLL hereinafter). The pilot signal is supplied to one input terminal of a phase comparator (to be referred to as a first phase comparator hereinafter) while the oscillation signal from a voltage controlled oscillator (to be referred to as VCO hereinafter) is supplied to the other input terminal of the first phase comparator. Then, at the output terminal of the first phase comparator is obtained a dc voltage, which is proportional to the frequency and phase differences of the pilot signal and the oscillation signal, in accordance with the so-called S-shaped characteristics. This dc voltage is supplied to the VCO as a control voltage. Then, at the output terminal of the VCO is obtained the oscillation signal which is frequency- and phase-synchronized with the pilot signal. It is to be noted, however, that the VCO freely oscillates since the frequency of the pilot signal is zero in the monaural mode.

The first discriminating means has a phase shifter for shifting the phase of the oscillation signal from the VCO through 90°, and a second phase comparator for comparing the phase of the output signal from the phase shifter with that of the pilot signal. With the mode discrimination circuit of this configuration, in the monaural broadcasting mode, since the frequency of the pilot signal supplied to one input terminal of the first phase comparator is zero, the dc voltage output from the second phase comparator becomes low level. In the multiplex broadcasting mode, since the pilot signal supplied to one input terminal of the first phase comparator and the oscillation signal from the VCO are frequency- and phase-synchronized, the dc voltage output from the second phase comparator becomes high level. In this manner, the dc voltage output from the second phase comparator takes different levels depending on whether the broadcasting mode is the monaural broadcasting mode or the multiplex broadcasting mode. The first discriminating means performs the discrimination of the broadcasting mode utilizing this level difference.

The second discriminating means discriminates the dc voltage output from the first comparator with reference to a predetermined threshold voltage so as to discriminate if the broadcasting mode is the dual-sound broadcasting mode or the stereophonic broadcasting mode. Let f0 denote the free-oscillation frequency of the VCO, and f1 and f2 denote the frequency (922.5 Hz) of the pilot signal in the dual-sound broadcasting mode and the frequency (982.5 Hz) of the pilot signal in the stereophonic mode. Then, if the dc voltages, output from the first phase comparator when the oscillation frequencies of the VCO are respectively f1 and f2, are denoted by E1 and E2, the threshold voltage as described above is set to be halfway between the dc voltages E1 and E2. The threshold voltage may be a dc voltage E0 of the first phase comparator when the VCO freely oscillates.

Thus, the conventional mode discrimination circuit has two discriminating means. The final discrimination result is obtained by subjecting the discrimination results from these two mode discriminating means to logic operation, for example.

However, the conventional mode discrimination circuit as described above has the following drawbacks. First, in the conventional mode discrimination circuit, there are differences in the discrimination characteristics with respect to the intensity of the electric field of the broadcasting electromagnetic waves between the first and second discriminating means. More specifically, the lower limit of the intensity of the electric field of the first discriminating means for allowing the discrimination of the broadcasting mode is higher than that of the second discriminating means. In this case, when the first discriminating means can no longer perform the mode discrimination below this lower limit, the state of the output from the first discriminating means becomes the same as that obtainable when the monaural broadcasting mode is discriminated. Therefore, when the intensity of the electric field ranges from the lower limit of the intensity of electric field which allows the second discriminating means to function to the lower limit of the intensity of electric field which allows the first discriminating means to function, the broadcasting mode may be discriminated erroneously as monaural broadcasting mode in the final logic operation, despite the second mode discriminating means correctly discriminates the dual-sound broadcasting mode or the stereophonic broadcasting mode.

Furthermore, the conventional mode discrimination circuit requires a plurality of circuits for constituting the first and second discriminating means which are connected to the PLL in addition to the PLL itself. This makes the overall circuitry complex in configuration and makes the integration of the circuitry difficult.

SUMMARY OF THE INVENTION

It is, therefore, the primary object of the present invention to provide a mode discrimination circuit which is capable of correctly performing mode discrimination even with a weak electric field, when the circuit is used for discriminating the mode of TV sound multiplex broadcasting.

It is another object of the present invention to provide a mode discrimination circuit which is capable of correctly discriminating the broadcasting mode even if video signals leak or noise components are mixed in the superposition range of the pilot signals, when the circuit is used for discriminating the mode of TV sound multiplex broadcasting.

The present invention thus provides a novel mode discrimination circuit. In the mode discrimination circuit of the present invention, the pilot signal contained in the composite transmission signal to discriminate the mode of transmission of the composite signal is supplied to the PLL. The PLL has a phase comparing means, and a means for generating an oscillation signal having an oscillation frequency which is determined by the input voltage. The phase comparing means compares the frequencies and the phases of the oscillation signal and the pilot signal, and outputs a dc voltage corresponding to the difference therebetween. This dc voltage is supplied to the oscillation signal generating means as an input voltage.

The dc voltage is also supplied to a voltage comparing means. This voltage comparing means has at least two threshold voltages which thus define at least three voltage ranges. The voltage comparing means compares the dc voltage with the threshold voltages so as to detect within which voltage range the dc voltage falls. As a result, the voltage comparing means discriminates the transmission mode.

DETAILED DESCRIPTION OF THE PREFERRED EMBODIMENT

Figure 1:
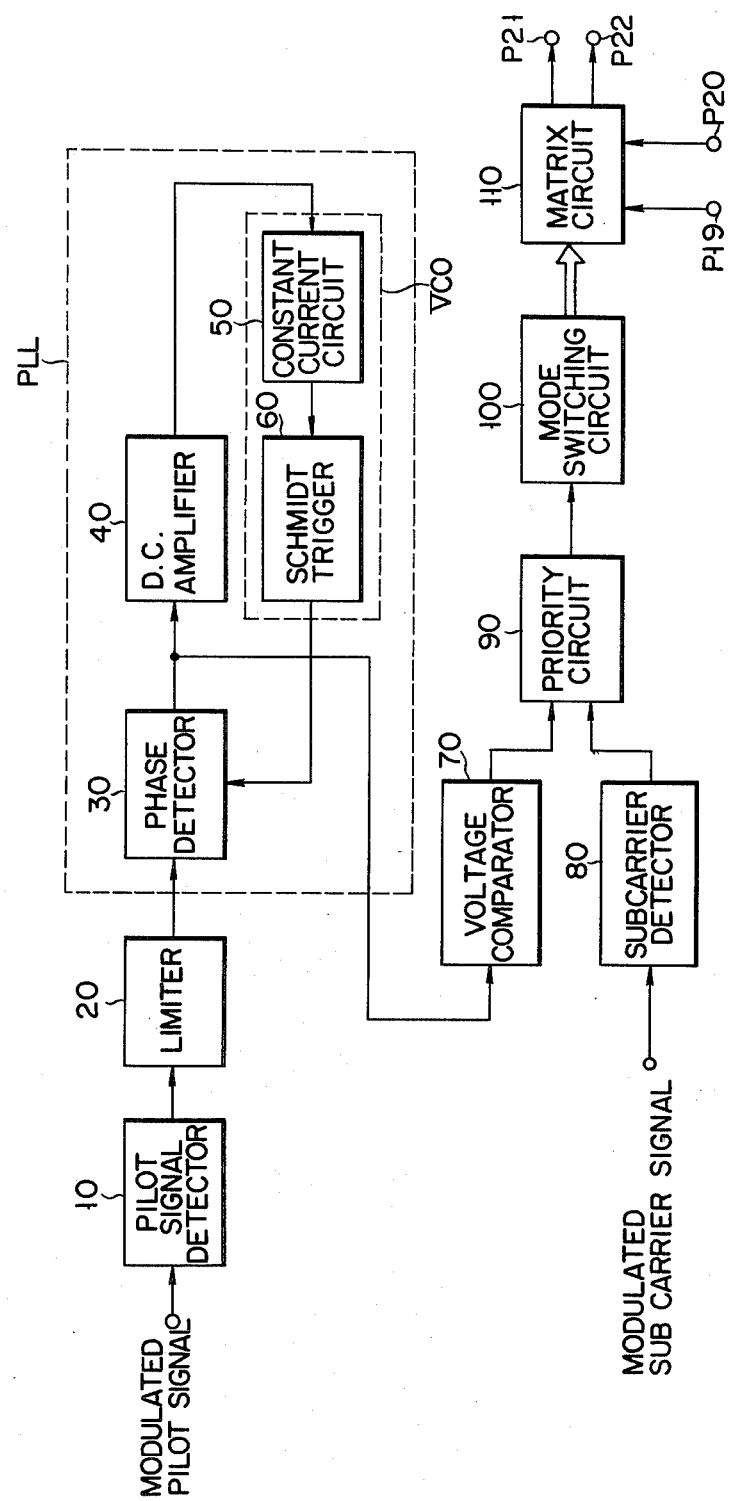
FIG. 1 is a block diagram showing a mode discrimination circuit according to an embodiment of the present invention.

FIG. 1 is a block diagram showing a mode discrimination circuit according to the present invention. A modulated pilot signal separated by a band-pass filter (not shown) for separation of the modulated pilot signal is supplied to a pilot signal detector 10. The detection signal output by the pilot signal detector 10 is supplied to a limiter 20. An amplitude-limited signal output from the limiter 20 is supplied to one input terminal of a phase comparator 30. An oscillation signal from a Schmidt trigger circuit 60 to be described later is supplied to the other input terminal of the phase comparator 30. A dc voltage output from the phase comparator 30 is supplied to a dc amplifier 40. An amplified signal output from the dc amplifier 40 is supplied to a constant current circuit 50 to be converted into a triangular wave. The triangular wave output from the constant current circuit 50 is supplied to the Schmidt trigger circuit 60 to be converted into a rectangular wave.

The phase comparator 30, the dc amplifier 40, the constant current circuit 50, and the Schmidt trigger circuit 60 constitute the PLL. The constant current circuit 50 and the Schmidt trigger circuit 60 constitute the VCO within the PLL.

The dc voltage from the phase comparator 30 is supplied to a voltage comparator 70 for discrimination of the broadcasting mode. The discrimination signal output from the voltage comparator 70 is supplied to one input terminal of a priority circuit 90 to be described later.

Reference numeral 80 denotes a subcarrier detector to which the modulated subchannel signal is supplied, which has been separated by a band-pass filter (not shown) for separation of the modulated subchannel signals. The subcarrier detector 80 discriminates the broadcasting mode through detection of the presence or absence of the subcarrier. The discrimination signal output from the subcarrier detector 80 is supplied to the other input terminal of the priority circuit 90.

On the basis of the discrimination signals described above, the priority circuit 90 performs the final discrimination. The discrimination signal output from the priority circuit 90 is supplied to a mode switching circuit 100. The switching signal output from the mode switching circuit 100 is fed to a matrix circuit 110.

FIGS. 2 through 8 are circuit diagrams showing examples of the respective circuits shown in FIG. 1. In these figures, the parts surrounded by broken lines are integrated. Reference numerals for the respective blocks shown in FIG. 1 correspond to the parts surrounded by the broken lines. Nodes of the respective circuit elements are denoted by terminals with the same symbols throughout these figures. Of the respective terminals, the terminal with a symbol Vcc is a power source terminal, the terminal with a symbol G is a reference potential terminal, and terminals with symbols T10 to T20 are terminals for connection with the external parts.

Figure 9:
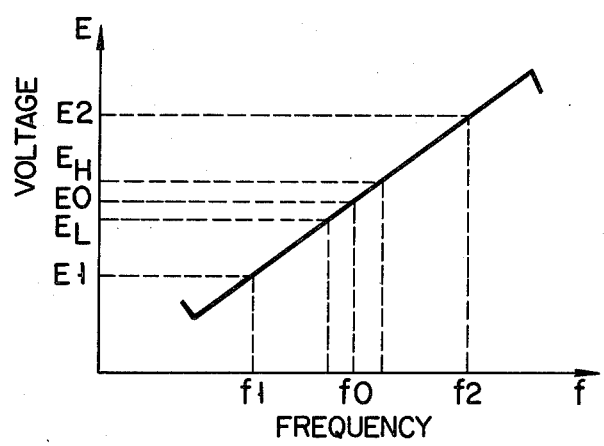
FIG. 9 is a graph showing the comparison characteristics of the phase comparator.

FIG. 9 is a graph showing the comparison characteristics of the phase comparator shown in FIG. 1.

Figure 2:
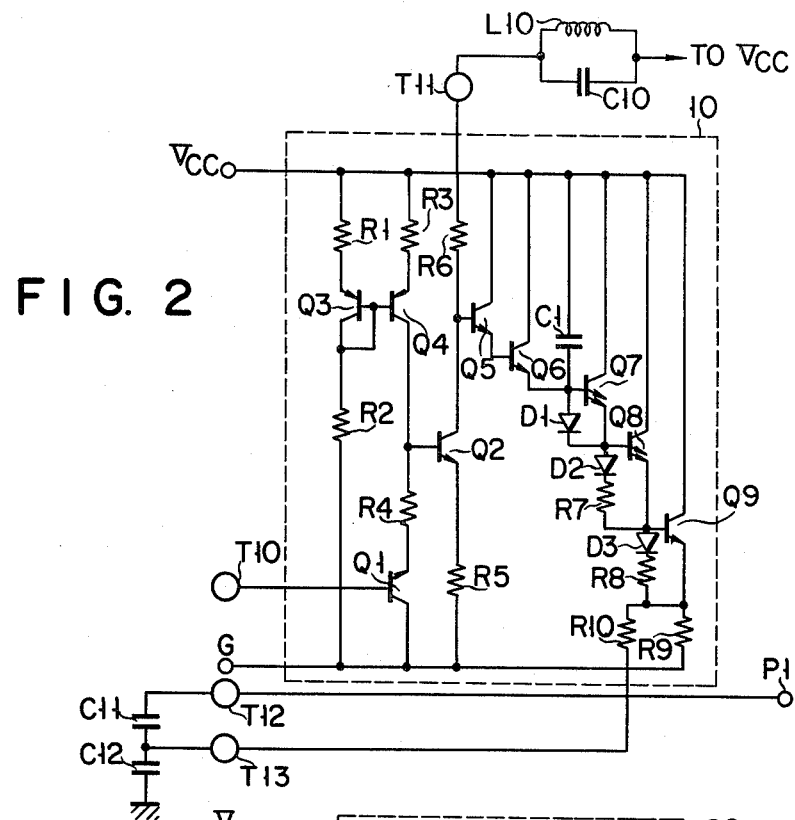
FIG. 2 is a circuit diagram showing an example of the configuration of a pilot signal detector as shown in FIG. 1.

The mode of operation of the circuitry shown in FIG. 1 will now be described in more detail with reference to FIGS. 2 to 9. At the pilot signal detector 10, unnecessary components are removed from the signal components separated by a band-pass filter (not shown) for separation of the modulated pilot signals. Thus, the modulated pilot signal alone is separated by the pilot signal detector 10. The modulated pilot signal is amplitude-demodulated into a pilot signal. As shown in FIG. 2, the pilot signal detector 10 comprises transistors Q1 to Q9, diodes D1 to D3, resistors R1 to R10, capacitors C1 and C10, and a coil L10. With the pilot signal detector 10 of this configuration, the signal separated by the band-pass filter (not shown) is supplied to a terminal T10, is amplified by the transistor Q1 serving as an emitter follower, and is supplied to the transistor Q2. The coil L10 and the capacitor C10 connected externally to a terminal T11 constitute a resonant circuit having a resonance frequency of 55.1 kHz. Thus, the modulated pilot signal (AM signal) alone is extracted from the collector of the transistor Q2. The modulated pilot signal is amplitude-demodulated and converted into the pilot signal by an amplitude demodulator comprising diode coupling between the bases and emitters of the transistors Q5 and Q6 and the capacitor C1. The pilot signal obtained in this manner is amplified by a circuit comprising transistors Q7 to Q9, diodes D1 to D3 and resistors R7 to R10. The amplified pilot signal is supplied to the limiter 20 through a capacitor C11 externally connected to terminals T12 and T13. The unnecessary components are by-passed to a reference potential terminal through a capacitor C12.

Figure 3:
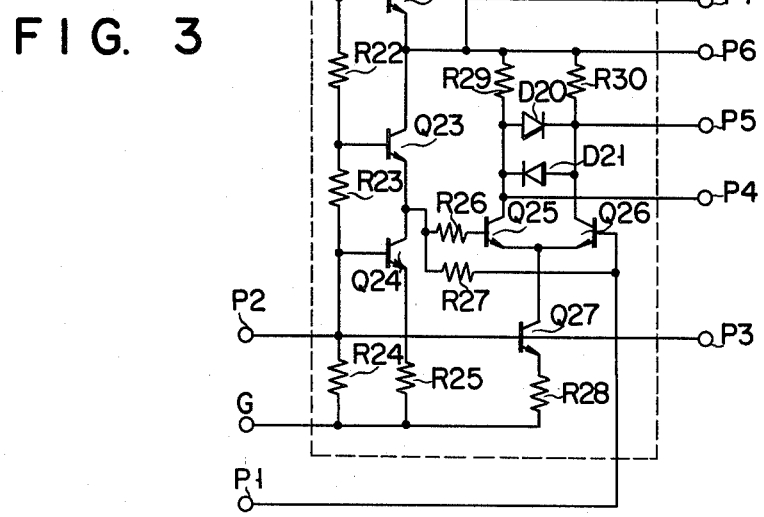
FIG. 3 is a circuit diagram showing an example of the configuration of a limiter shown in FIG. 1.

The pilot signal supplied to the limiter 20 is converted into a signal having a predetermined amplitude. The limiter circuit 20, as shown in FIG. 3, comprises transistors Q21 to Q27, diodes D20 and D21, and resistors R20 to R30. With the limiter 20 of this configuration, the pilot signal is supplied to the base of one transistor Q26 of a differential pair of transistors Q25 and Q26, and is amplitude-limited by the diodes D20 and D21. Then, the pilot signals having opposite polarities and predetermined amplitudes are output from the collectors of the transistors Q25 and Q26 and are supplied to the phase comparator 30.

Figure 4:
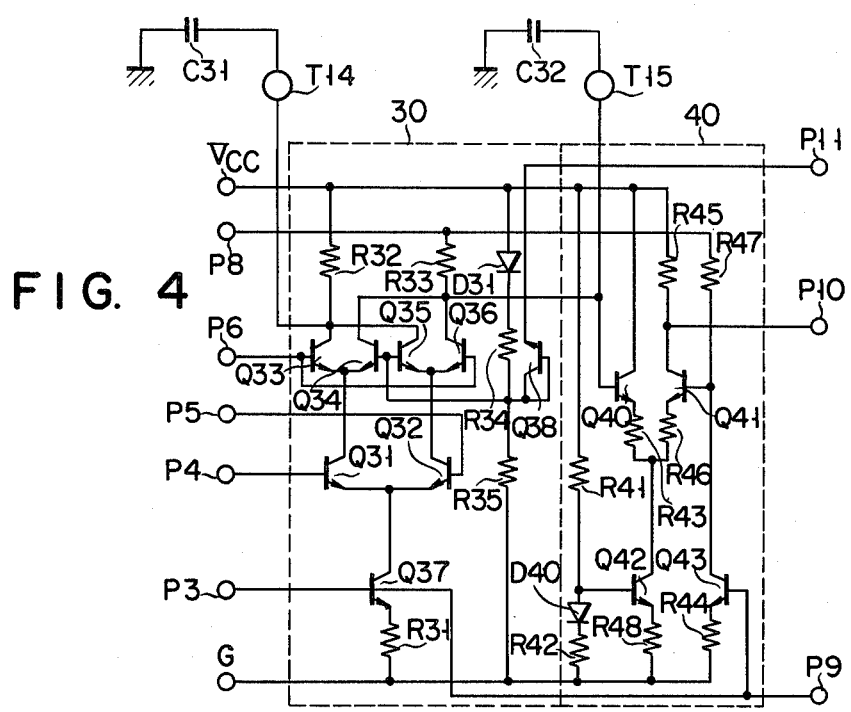
FIG. 4 is a circuit diagram showing an example of the configuration of a phase comparator and a dc amplifier shown in FIG. 1.

The pilot signals supplied to the phase comparator 30 are compared with the oscillation signal from the Schmidt trigger circuit 60, that is, the oscillation signal from the VCO with respect to their phases and frequencies. Then, dc voltages proportional to the frequency difference and the phase difference are obtained at the output terminal of the phase comparator 30 according to the S shaped characteristics. The phase comparator 30 comprises, as shown in FIG. 4, transistors Q31 to Q38, a diode D31, resistors R31 to R35, and capacitors C31 and C32. With the phase comparator 30 of this configuration, the pilot signal obtained at the collector of the transistor Q25 of the limiter 20 is supplied to the base of one transistor Q31 of a differential pair of transistors Q31 and Q32. On the other hand, the pilot signal obtained at the collector of the transistor Q26 is supplied to the base of the other transistor Q32. The oscillation signal from the VCO is supplied to the common node of the transistors Q34 and Q35 through the transistor Q38. The transistors Q33 to Q36 constitute a double balanced-type differential amplifier, and signals proportional to the frequency difference and the phase difference are obtained at the common node of the collectors of the transistors Q33 and Q35 and at the common node of the collectors of the transistors Q34 and Q36. The signal obtained at the common node of the collectors of the transistors Q33 and Q35 is converted into a dc voltage by the capacitor 31 which is externally connected to a terminal T14. On the other hand, the signal obtained at the common node of the collectors of the transistors Q34 and Q36 is converted into a dc voltage by the capacitor C32 externally connected to a terminal T15.

The dc voltage stored in the capacitor C32 is dc-amplified by a dc amplifier 40. The dc amplifier 40 specifically comprises, as shown in FIG. 4, transistors Q40 to Q43, resistors R41 to R48, and a diode 40. With the dc amplifier 40 of this configuration, the dc voltage is supplied to the base of the transistor Q40, dc-amplified, and is obtained at the collector of the transistor Q41.

Figure 5:
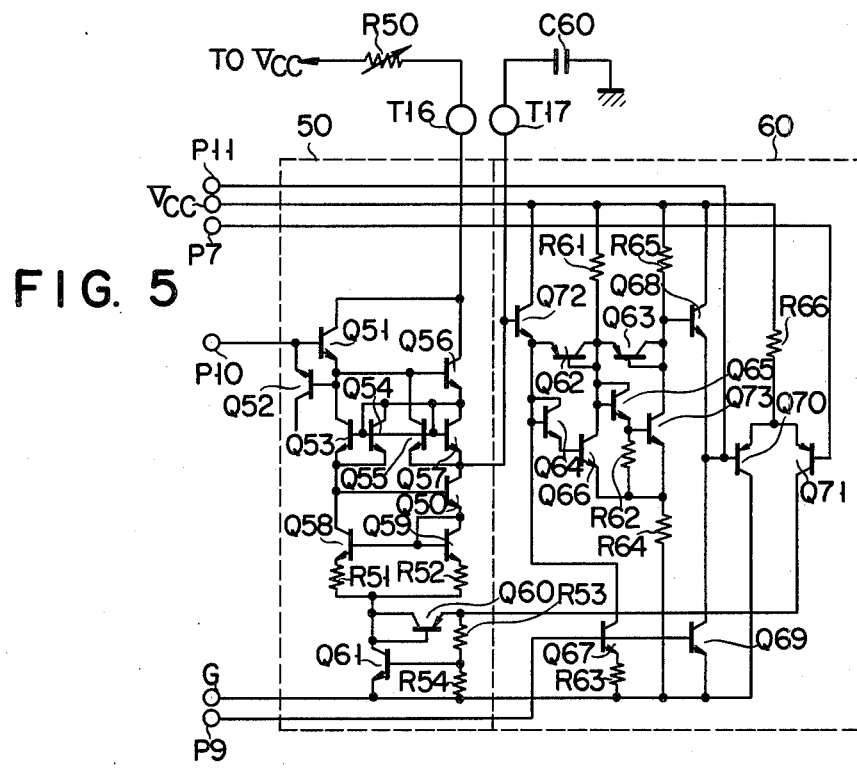
FIG. 5 is a circuit diagram showing an example of the configuration of a constant current circuit and a Schmidt trigger circuit shown in FIG. 1.

The signal output from the collector of the transistor Q41 is supplied to a constant current circuit 50 as a control voltage of the VCO. Thus, an oscillation signal, frequency- and phase-synchronized with the pilot signal is obtained at the output terminal of the VCO. In the monaural broadcasting mode, since the frequency of the pilot signal is zero, the VCO freely oscillates at the frequency f0. The VCO has a configuration as shown in FIG. 5. The constant current circuit 50 comprises transistors Q50 to Q61, resistors R51 to R54, and a variable resistor R50. The Schmidt trigger circuit 60 comprises transistors Q62 to Q73, resistors R61 to R66, and a capacitor C60.

The common node of the collectors of the transistors Q51 and Q56 is connected to a power source Vcc through a variable resistor R50 externally connected to a terminal T16. The common node of the emitters of the transistors Q55 and Q57 is externally connected to a terminal T17 as well as to the capacitor C60 serving as an integrating capacitor. The capacitor 60 is also connected to the base of a transistor Q72 of the Schmidt trigger circuit 60.

With this configuration, a current corresponding to the control voltage output from the dc amplifier 40 flows through the variable resistor R50. Assume that the transistor Q61 of the constant current circuit 50 is turned off. Then, the current flowing through the variable resistor R50 is stored in the capacitor C60 through the transistors Q56 and Q57. If the voltage stored in the capacitor C60 in this manner is lower than the threshold voltage of the Schmidt trigger circuit 60, the transistors Q72, Q66, Q68 and Q71 are turned off, while the transistors Q73 and Q70 are turned on. On the other hand, when the voltage stored in the capacitor C60 exceeds the threshold voltage, the transistors Q72, Q66, Q68 and Q71 are turned on, while the transistors Q73 and Q70 are turned off. In this condition, the transistor Q61 is turned on. When the transistor Q61 is turned on, the emitter potential of the transistor Q53 is lowered, and the base potential thereof is also lowered. Then, the base potentials of the transistors Q55 and Q57 become lower than the emitter potentials thereof, so that the transistors Q55 and Q57 are turned off. As a result, the current which has been flowing through the variable resistor R50 now flows through the transistors Q51, Q53 and Q58. Since the transistors Q58 and Q59 form a current-mirror circuit, the charge stored on the capacitor C60 is discharged through the transistors Q50, Q59 and Q61.

According to the mode of operation as described above, a voltage of a triangular waveform is obtained across the capacitor C60 of the constant current circuit 50. The voltage of triangular waveform is converted into a rectangular wave by the Schmidt trigger circuit 60, and is obtained from the emitter of the transistor Q68. The signal obtained from the emitter of the transistor Q68 is supplied to the common node of the bases of the transistors Q34 and Q35 through the transistor Q38 of the phase comparator 30 as the oscillation signal of the VCO. Since rates of changes over time of the charging current and the discharging current of the capacitor C60 are both determined by the current flowing through the variable resistor R50, they are equal to each other.

The dc voltage charged in the capacitor C31 is supplied to the voltage comparator 70. The voltage comparator 70 discriminates if the level of the dc voltage corresponds to the dual-sound broadcasting mode, the stereophonic broadcasting mode or the monaural broadcasting mode. The mode of operation of the voltage comparator 70 will now be described with reference to FIG. 9. FIG. 9 shows the comparison characteristics of the phase comparator 30, wherein the oscillation frequency f of the VCO is plotted along the abscissa, while the dc voltage E is plotted along the ordinate. As shown in this graph, the comparison characteristics are represented by S shaped characteristics. If the broadcasting mode is the dual-sound broadcasting mode, since the frequency of the pilot signal is f1, the oscillation frequency is also f1. If the broadcasting mode is the stereophonic broadcasting mode, since the frequency of the pilot signal is f2, the oscillation frequency is also f2. If the broadcasting mode is the monaural broadcasting mode, since the frequency of the pilot signal is zero, the VCO freely oscillates and the oscillation frequency f becomes f0. Voltages E1, E2 and E0 respectively correspond to the dc voltages obtained in the dual-sound broadasting mode, the stereophonic broadcasting mode, and the monaural broadcasting mode.

The voltage comparator 70 discriminates the level of the dc voltage E with reference to first and second threshold voltages EL and EH which are preset to different levels. The first threshold voltage EL is set about halfway between the dc voltages E1 and E0, while the second threshold voltage EH is set about halfway between the dc voltages E0 and E2. When the threshold voltage E of the voltage comparator 70 is lower than the first threshold voltage EL, the broadcasting mode is discriminated to be the dual-sound broadcasting mode. If the dc voltage E is higher than the second threshold voltage EH, the broadcasting mode is discriminated to be the stereophonic broadcasting mode. When the dc voltage E falls between the first and second threshold voltages EL and EH, the broadcasting mode is discriminated to be the monaural broadcasting mode.

Figure 6:
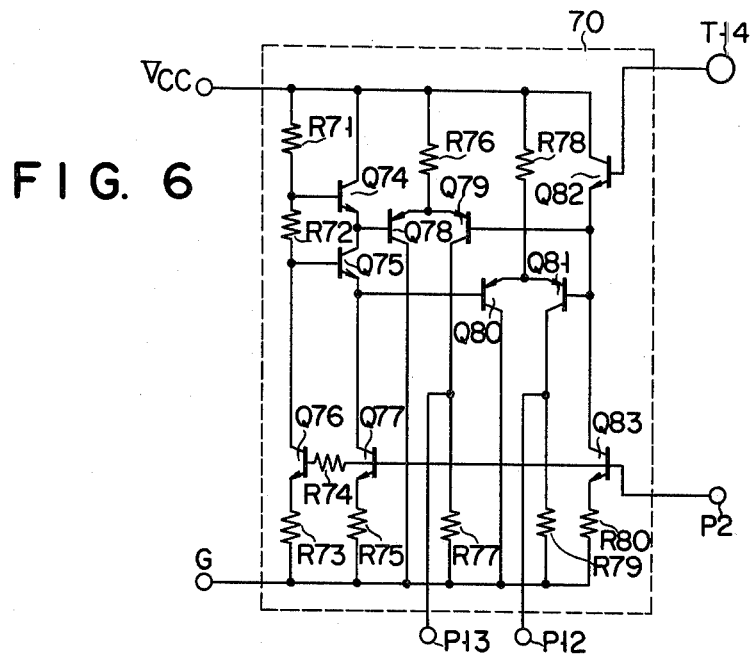
FIG. 6 is a circuit diagram showing an example of the configuration of a voltage comparator shown in FIG. 1.

More specifically, the voltage comparator 70 comprises, as shown in FIG. 6, transistors Q74 to Q83 and resistors R71 to R80. The transistors Q78 and Q79 and the transistors Q80 and Q81 respectively constitute differential pairs. An output terminal P13 is formed on the collector of one (i.e. transistor Q79) of the transistors in one differential pair and an output terminal P12 on the collector of one (i.e. transistor Q81) of the transistors in the other differential pair. The transistors Q78 and Q79 are alternately turned on and off. The threshold voltage for these transistors Q78 and Q79 is set by a bias circuit comprising the transistors Q74 to Q77, the resistors R71 to R75, and so on. In this case, the threshold voltage of the transistors Q78 and Q79 is set to the voltage EH by the bias circuit described above. The transistor Q79 is turned on when the base potential thereof is lower than the threshold voltage EH and is turned off when the base potential thereof is higher than the threshold voltage EH. The transistors Q80 and Q81 are also alternately turned on and off. The threshold voltage of the transistors Q80 and Q81 is set to the voltage EL by the bias circuit described above. In this case, the transistor Q81 is turned on when the base potential thereof is lower than the threshold voltage EL and is turned off when the base potential thereof is higher than the threshold voltage EL.

According to the configuration as described above, since the dc voltage of the phase comparator 30 becomes E1 (where E1<EL) in the dual-sound broadcasting mode, both the transistors Q79 and Q81 are turned on. In the stereophonic broadcasting mode, since the dc voltage becomes E2 (where E2>EH), both the transistors Q79 and Q81 are turned off. In the monaural broadcasting mode, since the dc voltage becomes E0 (where EL<E0<EH), the transistor Q81 is turned off while the transistor Q79 is turned ON. Thus, the logic values at the output terminals P13 and P12 become as shown in Table I below according to the respective broadcasting modes:

TABLE I

| | Dual-sound broadcasting mode | Monaural broadcasting mode | Stereophonic broadcasting mode |
|---|---|---|---|
| Output terminal (P12) | 1 | 0 | 0 |
| Output terminal (P13) | 1 | 1 | 0 |

The subcarrier detector 80 receives the signal separated by the band-pass filter for separating the modulated subchannel signals and discriminates if there is a modulated subchannel signal, that is, if the subcarrier is present in the received TV sound multiplex signal. This discrimination, in effect, provides the discrimination of whether the broadcasting mode is the monaural broadcasting mode or the multiplex broadcasting mode (dual-sound broadcasting mode or the stereophonic broadcasting mode).

Figure 7:
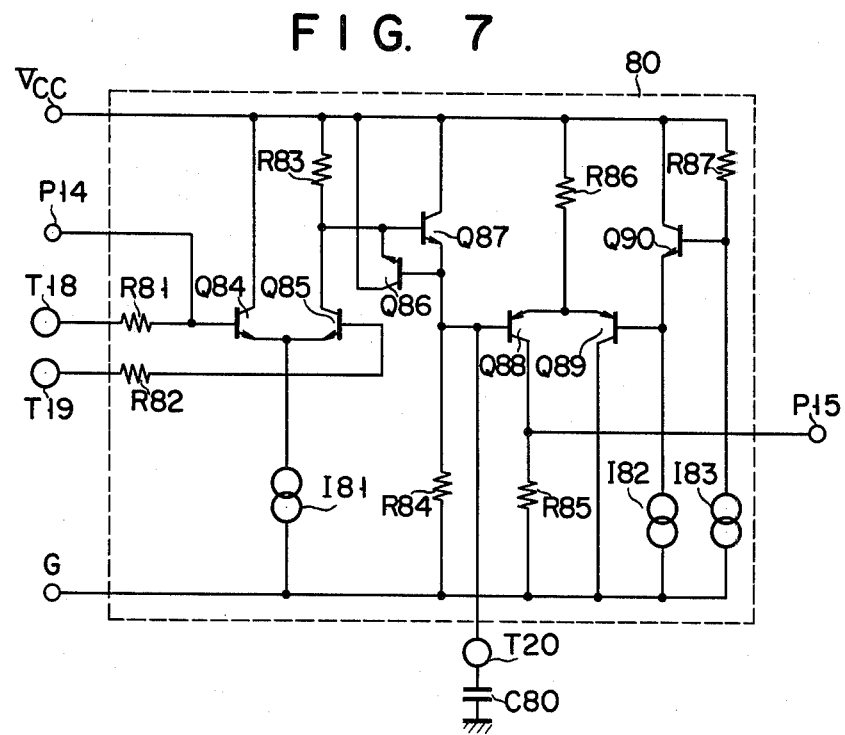
FIG. 7 is a circuit diagram showing an example of the configuration of a subcarrier detector shown in FIG. 1.

The subcarrier detector 80 specifically comprises, as shown in FIG. 7, transistors Q84 to Q90, constant current sources I81 to I83, resistors R81 to R87, and a capacitor C80. A dc bias is applied to the bases of the transistors Q84 and Q85 through terminals T18 and T19. The output signal from the band-pass filter for separation of the subchannel signals is supplied through a terminal P14 to a differential amplifier which comprises the transistors Q84 and Q85, the constant current source I81, and the resistor R83. The signal amplified by the differential amplifier is supplied from the collector of the transistor Q85 to the emitter follower transistor Q87. This signal is then amplitude-demodulated by the transistor Q87, the transistor Q86, and the capacitor C80 externally connected to a terminal T20. The signal thus obtained is stored in the capacitor C80 and converted into dc voltage. The transistors Q88 to Q90, the constant current sources I82 and I83, and the resistors R85 to R87 constitute a comparator. The transistors Q88 and Q89 are alternately turned on and off according to the level of the dc voltage stored in the capacitor C80. The comparison result from the comparator is obtained at an output terminal P15 at the collector of the transistor Q88.

In the multiplex broadcasting mode, since the modulated subchannel signal is detected, the dc voltage stored on the capacitor C80 is high and the transistor Q88 is turned off. Then, the voltage level at the output terminal P15 becomes low. In the monaural broadcasting mode, since the modulated subchannel signal is not detected, the dc voltage stored on the capacitor C80 is low and the transistor Q88 is turned on. Then, the voltage level at the output terminal P15 becomes high. In this manner, the subcarrier detector 80 discriminates if the broadcasting mode is the multiplex broadcasting mode or the monaural broadcasting mode through the detection of the presence or absence of the subcarriers. In this case, the logic value at the output terminal P15 is "0" in the multiplex broadcasting mode and is "1" in the monaural broadcasting mode.

Figure 8:
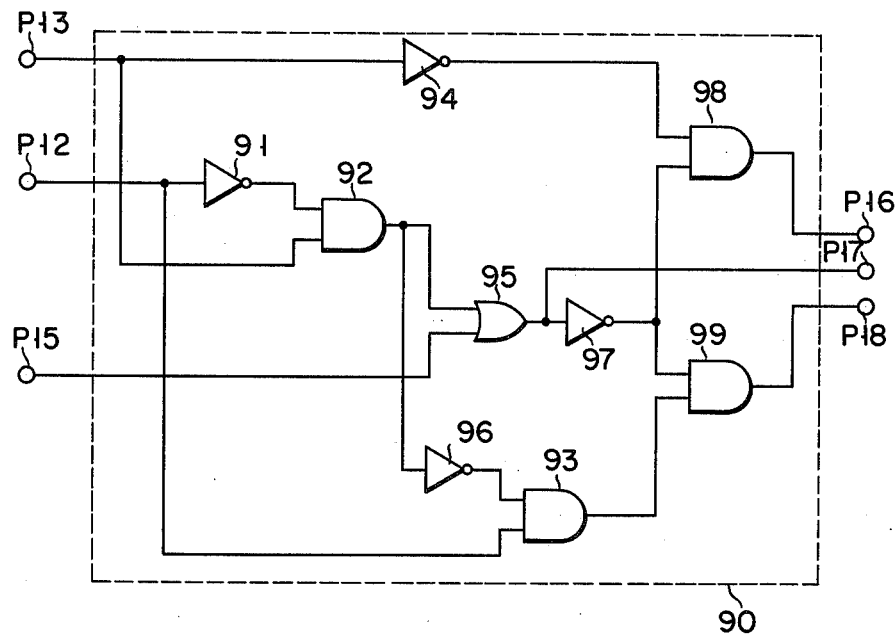
FIG. 8 is a circuit diagram showing an example of the configuration of a priority circuit shown in FIG. 1.

The discrimination signal from the subcarrier detector 80 and the discrimination signal from the voltage comparator 70 are supplied to the priority circuit 90. The priority circuit 90 makes the final discrimination on the basis of both discrimination signals and outputs a discrimination signal. The priority circuit 90 specifically comprises, as shown in FIG. 8, inverters 91, 94, 96 and 97; AND circuits 92, 93, 98 and 99; and an OR circuit 95.

An output terminal P12 of the voltage comparator 70 is connected to one input terminal of the AND circuit 92 through the inverter 91 as well as to one input terminal of the AND circuit 93. An output terminal P13 is connected to the other input terminal of the AND circuit 92 as well as to one input terminal of the AND circuit 98 through the inverter 94. The output terminal P15 of the subcarrier detector 80 is connected to one input terminal of the OR circuit 95. The output terminal of the AND circuit 92 is connected to the other input terminal of the OR circuit 95 as well as to the other input terminal of the AND circuit 93 through the inverter 96. The output terminal of the OR circuit 95 is connected to the other input terminal of the AND circuit 98 through the inverter 97 as well as to one input terminal of the AND circuit 99. The output terminal of the AND circuit 93 is connected to the other input terminal of the AND circuit 99. The output terminals of the AND circuit 98, the OR circuit 95, and the AND circuit 99 are respectively connected to first, second and third output terminals P16, P17 and P18 of the priority circuit 90.

The priority circuit 90 of the configuration as described above subjects to the logic operation the discrimination signal from the voltage comparator 70 and the discrimination signal from the subcarrier detector 80. At the output terminals P16, P17 and P18 are obtained discrimination signals of logic values as shown in Table II below in accordance with the broadcasting mode:

TABLE II

| | Mode | | |
|---|---|---|---|
| | Dual-sound broadcasting mode | Monaural broadcasting mode | Stereophonic broadcasting mode |
| Output terminal P12 | 1 | 0 | 0 |
| Output terminal P13 | 1 | 1 | 0 |
| Output terminal P15 | 0 | 1 | 0 |
| Output from inverter 91 | 0 | 1 | 1 |
| Output from AND circuit 92 | 0 | 1 | 0 |
| Output from AND circuit 93 | 1 | — | 0 |
| Output from OR circuit 95 | 0 | 1 | 0 |
| Output from inverter 94 | 0 | — | 1 |
| Output from inverter 97 | 1 | 0 | 1 |
| Output terminal P16 | 0 | 0 | 1 |
| Output terminal P17 | 0 | 1 | 0 |
| Output terminal P18 | 1 | 0 | 0 |

When the discrimination signal representing the monaural broadcasting mode is obtained from the subcarrier detector 80, the priority circuit 90 produces the discrimination signal representing the monaural broadcasting mode irrespective of the content of the discrimination signal from the voltage comparator 70. Thus, when the subcarrier detector 80 discriminates the broadcasting mode to be monaural broadcasting mode, the level at the output terminal P15 is of logic value "1". Then, the logic value at the output terminal of the OR circuit 95 is constantly "1" irrespective of the logic values at the output terminals P12 and P13 of the voltage comparator 70. Then, the logic value at the output terminals of the AND circuits 98 and 99 is constantly "0" irrespective of the logic values at the output terminals P12 and P13. In this manner, the logic value at the output terminals P16, P17 and P18 become "0, 1, 0" which represent the monaural broadcasting mode.

A mode switching circuit 100 produces a switch signal for switching the operation of a matrix circuit 110 in accordance with the logic values at the output terminals P16, P17 and P18. In response to the switching signal, the matrix circuit 110 the main leads channel signal and the subchannel signal applied to the first and second input terminals P19 and P20 directly to a left channel output terminal P21 and a right channel output terminal P22, respectively, in the dual-sound broadcasting mode. However, if the broadcasting mode is the stereophonic mode, the matrix circuit 110 converts the main channel signal and the subchannel signal applied to the first and second input terminals P19 and P20, into the matrix signals which are supplied to corresponding output terminals P21 and P22. In this manner, a left signal L obtained by the addition of the main channel signal (L+R) with the subchannel signal (L−R) is supplied to the left channel output terminal P21, while a right signal R obtained by subtraction of the subchannel signal (L−R) from the main channel signal (L+R) is supplied to the right channel output terminal P22. If the broadcasting mode is the monaural broadcasting mode, the main channel signal applied to the first input terminal P19 is directly supplied to the left and right channel output terminals P21 and P22. The signals supplied to the respective output terminals P21 and P22 are reproduced by the corresponding speakers (not shown).

The embodiment as described above has the following advantages. According to this embodiment, the broadcasting mode can be discriminated by simply monitoring the dc voltage output from the phase comparator 30. The voltage comparator 70 has two threshold voltages EL and EH as described above, and discriminates the broadcasting mode by determining within which one of the three voltage ranges defined by the threshold voltages EL and EH, i.e., E<EL, E>EH and EL<E<EH falls the dc voltage E. The configuration of this embodiment may be considered to be equivalent to the conventional circuit described above with the first discriminating means being eliminated, which has inferior discrimination characteristics of the TV sound multiplex signal in relation to the intensity of the electric field. Therefore, the discrimination characteristics of this embodiment roughly correspond to those of the second discriminating means. Therefore, according to the embodiment of the present invention, the erroneous mode discrimination with a weak electric field may be significantly eliminated as compared to the conventional circuit.

According to the embodiment of the present invention, since the subcarrier detector 80 is incorporated, the erroneous mode discrimination may be prevented even if the video signals leak or the noise components are mixed in. If the noise components are mixed in the superposition range of the pilot signals or the video signals leak, the dc voltage E from the phase comparator 30 will have a level outside the range between the voltages EL and EH even if the broadcasting mode is the monaural broadcasting mode. Then, the voltage comparator 70 discriminates the broadcasting mode to be the multiplex broadcasting mode (dual-sound broadcasting mode or stereophonic broadcasting mode). In this case, the subcarrier detector 80 differentiates between the monaural broadcasting mode and the multiplex broadcasting mode through the detection of the subcarrier waves. Therefore, a correct discrimination output may be obtained by the subcarrier detector 80 even if the noise components are mixed in or the video signals leak. As has been described above, if the discrimination signal representing the monaural broadcasting mode is available from the subcarrier detector 80, the priority circuit 90 constantly outputs a discrimination signal representing the monaural broadcasting mode irrespective of the content of the discrimination signal from the voltage comparator 70. Even if the discrimination signal representing the multiplex broadcasting mode is output from the voltage comparator 70 in the monaural broadcasting mode, the discrimination signal representing the monaural broadcasting mode is obtained by the subcarrier detector 80. Accordingly, the monaural broadcasting mode may be correctly discriminated.

According to the embodiment of the present invention, the voltage comparator 70 alone can perform the function which is effected by the first and second discriminating means in the conventional mode discrimination circuit. Thus, the mode discrimination circuit according to the embodiment of the present invention provides a simple circuit arrangement and is suitable for IC version.

The present invention is not limited to the particular embodiments described above. For example, the above embodiment is described with reference to the case wherein the discrimination is performed according to the logic operation. However, the discrimination may alternatively be performed by the analog operation.

It is also to be understood that the present invention is also applicable to various circuits other than the circuit for discriminating the broadcasting mode of TV sound multiplex broadcasting.

What is claimed is:

1. A mode discrimination circuit comprising:
    means for detecting a pilot signal which is transmitted for discriminating a transmission mode of a composite transmission signal;
    means for generating an oscillation signal having an oscillation frequency determined depending upon an input voltage;
    phase comparing means for comparing frequencies and phases of the oscillation signal from said generating means and the pilot signal from said detecting means so as to output a dc voltage signal proportional to a difference therebetween, the dc voltage being supplied to said generating means as the input voltage; and
    voltage comparing means having at least two threshold voltages, thus defining at least three voltage ranges, for comparing the dc voltage output from said phase comparing means with the threshold voltages so as to detect within which voltage range the dc voltage falls, thereby discriminating the transmission mode.

2. A mode discrimination circuit according to claim 1, further comprising:
    subcarrier detecting means for detecting a presence or absence of a carrier of a predetermined signal in the composite transmission signal so as to discriminate the transmission mode; and
    priority means for selecting a discrimination result from said subcarrier detecting means with a priority over a discrimination result from said voltage comparing means if the transmission mode is a predetermined mode.

3. A mode discrimination circuit according to claim 1 or 2, wherein said detecting means has:
    a detecting circuit which detects the modulated pilot signal of the composite broadcasting signal and which demodulates the detected, modulated pilot signal; and
    a limiter circuit which limits an amplitude of the demodulated pilot signal to a predetermined level.

4. A mode discrimination circuit according to claim 1 or 2, wherein said phase comparing means has:
    a phase comparator which compares the frequencies and phases of the pilot signal and the oscillation signal so as to output the dc differential voltage proportional to the difference therebetween; and
    a dc amplifier which amplifies the dc voltage output by said phase comparator.

5. A mode discrimination circuit according to claim 1 or 2, wherein said oscillating means has:
    a constant current circuit which generates a dc current, a value of which is determined depending upon the dc voltage output by said phase comparing means, which charges a capacitor or discharges charge stored on said capacitor according to the dc current, and which generates a triangular wave; and
    a Schmidt trigger circuit which converts the triangular wave output by said constant current circuit into a rectangular wave.

6. A mode discrimination circuit according to claim 1 or 2, wherein said voltage comparing means outputs the discrimination result of the transmission mode in the form of a logic value.

7. A mode discrimination circuit according to claim 2, wherein said subcarrier detecting means outputs the discrimination result of the transmission mode in the form of a logic value.

8. A mode discrimination circuit according to claims 2, 6 or 7, wherein said priority means comprises a logic circuit which is capable of processing the discrimination results which are output in the form of logic values by said voltage comparing means and said subcarrier detecting means.

9. A mode discrimination circuit according to claim 1 or 2, wherein said mode discrimination circuit is integrated.

* * * * *